(No Model.)

A. N. HOPKINS.
WAGON TIRE.

No. 401,275. Patented Apr. 9, 1889.

Witnesses
Susie R. Seiler.
A. W. Bishop.

Inventor
Albert N. Hopkins
By his Attorneys
R. S. & A. Lacey

UNITED STATES PATENT OFFICE.

ALBERT N. HOPKINS, OF CROOKSTON, MINNESOTA.

WAGON-TIRE.

SPECIFICATION forming part of Letters Patent No. 401,275, dated April 9, 1889.

Application filed April 3, 1886. Serial No. 197,646. (No model.)

*To all whom it may concern:*

Be it known that I, ALBERT N. HOPKINS, a citizen of the United States, residing at Crookston, in the county of Polk and State of Minnesota, have invented certain new and useful Improvements in Tires; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to supplemental tires for vehicle-wheels; and it consists in the construction of such tire, and the combination therewith of means for uniting the meeting ends and drawing of the tire close about the vehicle-wheel, said means also forming a stop on each side of the vehicle-wheel to assist in preventing its displacement laterally relative to the supplementary tire, as more fully hereinafter set forth and claimed, and shown in the accompanying drawings, in which—

Figure 1:
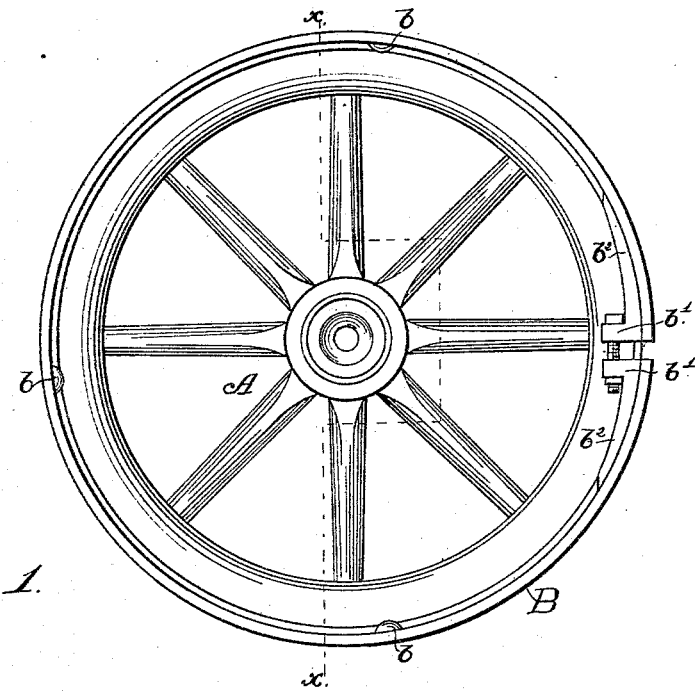
Figure 2:
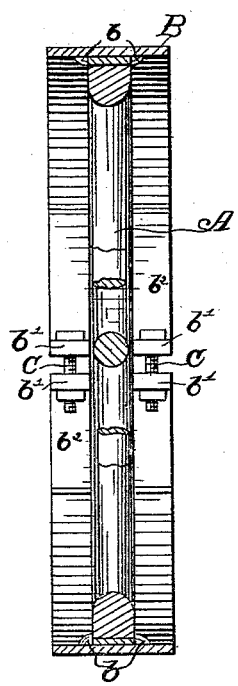

Figure 1 is a side view of a vehicle-wheel provided with a supplementary tire of my construction and provided with my improvements. Fig. 2 is a sectional view on the line X X of Fig. 1.

The vehicle-wheel A is of ordinary construction, and is shown as a means to illustrate the application of my invention. The supplementary tire B, which is of the requisite width and necessary length to encompass the wheel A, is made of thin bar or flat metal, and at stated intervals is provided with lugs $b$, arranged in pairs. The lugs of a pair are located at a distance apart equal to the width of the felly or tire of the vehicle-wheel for which the supplementary tire is designed. The meeting ends of the supplementary tire are each provided with lugs $b'$, which project inward toward the body of the wheel. These lugs are arranged so as to lie on each side of the plane of the wheel and perform the office of holding said supplementary tire against lateral displacement, in addition to that of affording a purchase for the bolts C—one on each side of the wheel—to draw the supplementary tire close about the wheel. By having a bolt on each side of the wheel an even tension may be placed on both edges of the supplementary tire.

The lugs $b'$ may be an integral part of the tire and formed by bending the ends of the tire at right angles and removing that portion corresponding with the wheel, so that the ends may meet on a straight line the full width of the tire. Said lugs may be strengthened and braced by a re-enforce, $b^2$. In supplementary tires the weak point is where the two ends come together. Unless these ends are braced in some manner the outer corner portions thereof will be turned inward and these tires thus rendered useless. I brace the ends by the lugs $b'$, arranged on opposite sides of the felly, to extend inward sufficiently far and to bear against the sides of the felly, thereby bracing the ends of the tire projecting on each side of the felly. By such construction the meeting ends, when coming in contact with a hard or unyielding substance, are prevented from being bent out of line transversely, which would be likely to occur if such ends were left unprotected.

Lugs $b$ may be an integral part of the tire and formed by being punched therefrom, or they may be projections welded or otherwise secured thereto.

I do not broadly claim a supplementary tire having lugs extending on each side of the wheel; nor do I claim a tire or band provided with inwardly-extending lugs transversely apertured, and bolts passing through said apertures in the lugs to draw the ends of the tire or band close together.

Having thus described my invention, what I claim, and desire to secure by Letters Patent, is—

The combination, with the wheel, of the supplementary tire, composed of the bar B, bent to embrace the rim of the wheel and having pairs of lugs at intervals to embrace the sides of the said rim, the re-enforcing strips $b^2$, secured to the proximate ends of the bar B and embracing the sides of the said rim, and having their ends provided with lugs $b'$, which extend radially inward and bear on the sides of the rim to brace the ends of the bar B, and the bolts, one on each side of the rim, passing through the said lugs $b'$, substantially as and for the purpose described.

In testimony whereof I affix my signature in presence of two witnesses.

ALBERT N. HOPKINS.

Witnesses:
 JOHN CROMB,
 A. C. COWING.